Jan. 28, 1958   L. J. WOODWARD   2,821,022
GAGE HOLDER AND SCALE MEANS – ATTACHMENT HOLDER AND NEW RULES
Filed March 21, 1955
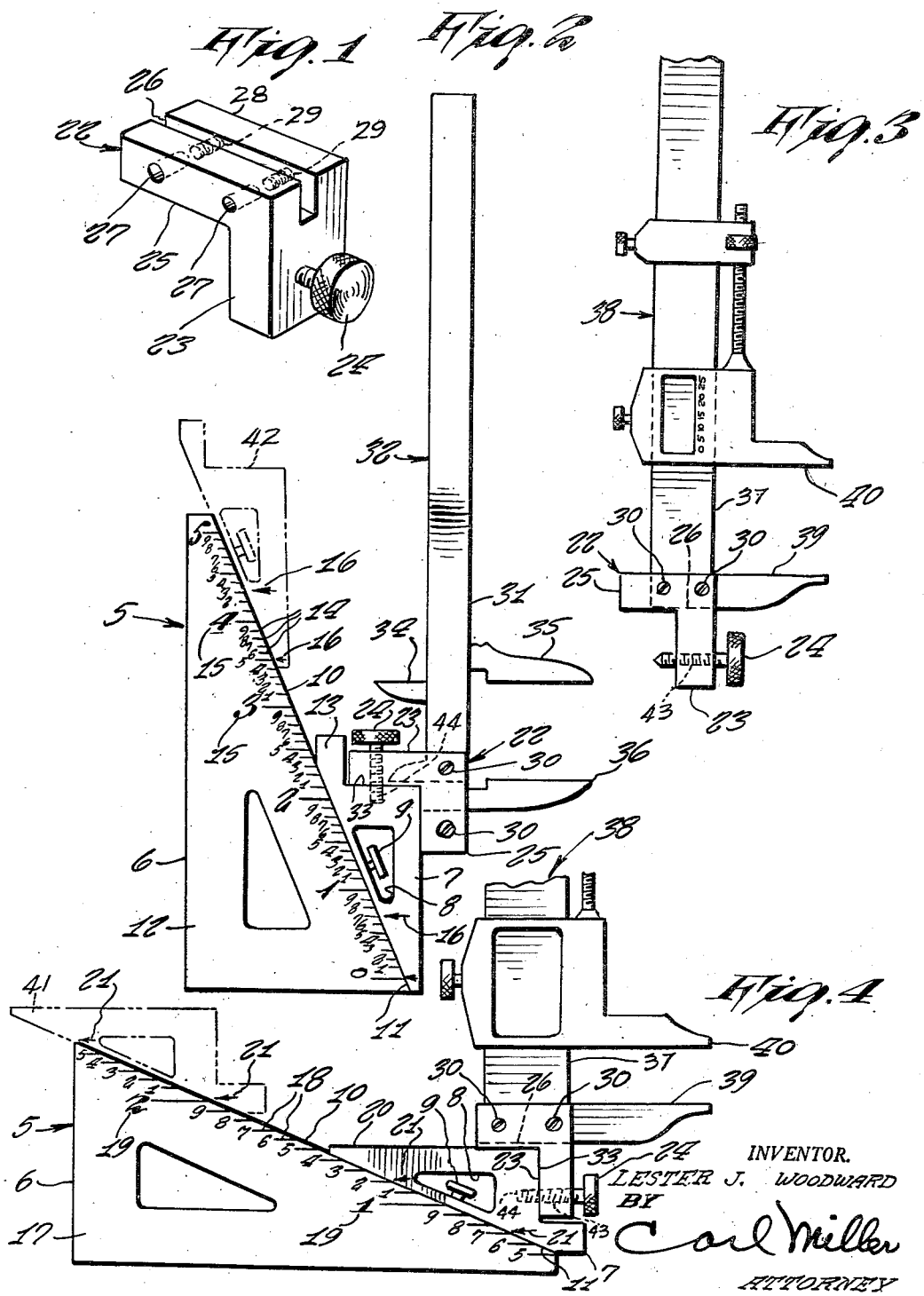
INVENTOR.
LESTER J. WOODWARD
BY
Carl Miller
ATTORNEY

United States Patent Office 2,821,022
Patented Jan. 28, 1958

2,821,022

GAGE HOLDER AND SCALE MEANS—ATTACHMENT HOLDER AND NEW RULES

Lester J. Woodward, Burbank, Calif.

Application March 21, 1955, Serial No. 495,425

1 Claim. (Cl. 33—162)

This invention relates to mechanical measuring devices and attachments, and particularly to a gage holder combined with a new scale or rule capable of use for taking measurements.

The main object of this invention is to provide an attachment for a planer gage and the like facilitating the taking of accurate measurements upon machines and of various mechanical parts.

An ancillary object of the invention is to have such an attachment that makes it possible to combine a planer gage and a micrometer caliper to serve together as a height gage or length gage.

Another object of my invention is to make a special holder for a planer gage to fit the latter so that a combination tool or instrument results.

A further object is also to introduce certain indicia on the triangular base member of the planer gage to co-operate with the slider thereof.

It is likewise an object to have such a combined planer gage and holder that is reasonable in cost and accurate and easy to use.

A practical object is, of course to have a holder attachment for a planer gage that may be applied for combined use as already outlined, and easily released or disengaged for normal use of the gage when desired.

Other objects and advantages of the invention will become evident as the specification proceeds.

In order to facilitate ready comprehension of this invention for a proper appreciation of the salient features thereof, the invention is illustrated on the accompanying drawing forming part hereof, and in which:

Figure 1 is a perspective view of a holder attachment made according to the invention and embodying the main features thereof in a practical form;

Figure 2 is a side elevation of a planer gage with the holder attached to the slider of the same and secured to an inside and outside caliper for combined use, the vernier portion of the caliper being torn away for simplicity in the view;

Figure 3 is also a side elevation of a vernier caliper as provided with the holder in a different position; and Figure 4 is a similar view of the same caliper and holder when mounted on the planer gage in another position of the gage than shown in Figure 2.

In these views, the same reference numerals indicate the same or like parts.

When machinists desire to measure the height, length and/or thickness of various machine parts, castings and the like, different kinds of calipers and gages are ordinarily used. However, in some cases it is not easy to obtain accurate measurements and also, a number of devices and instruments are required. It is always desirable to be in a position to obtain accurate and reliable measurements in various positions and relations, even while workpieces are held in or upon machine tools by using the same measuring instruments in different adjustments, and thereby simplify checking up on parts being made or about to be worked upon.

Upon considering this problem, it occurred to me that the gage used upon a planer could well be amplified in its sphere of usefulness, so that height, width, depth and even thickness of various parts and members of machines and devices can well be measured thereby by introducing an angle member and inscribing novel indicia upon the gage. As a result of such consideration, I have succeeded in producing such novel gage equipment along the lines already mentioned, and which will now be set forth in detail in the following.

Hence, in the practice of my invention, and referring also again to the drawing, a planer gage, generally indicated at 5 includes the triangular gage base 6 and the adjustable gage slider 7. The slider has an aperture 8 in which is located the adjusting and setting screw 9. The two gage members make contact along the inclined surface 10 of the base and the corresponding inclined surface 11 of the slider, but upon one side 12 of the base member and the same flush side 13 of the slider are inscribed a series of inch marks 14 with numerals 15 on this base 6 and the index marks 16 on the slider adapted to be registered with any one of the base marks. When the gage is in substantially upright position as shown in Figure 2 for maximum dimension measurements, the base and slider are marked as mentioned, while when the base is in horizontal position for transverse and lateral dimension measurements as shown in Figure 4, the other side 17 of the base has the marks 18 and numerals 19.

In other words, the base when lying in the horizontal position of Figure 4 has its side 17 flush with the corresponding side 20 of the slider and its markings 18 disposed horizontally, and the slider being provided with two spaced apart at 21 to correspond to these markings 18. In each case on both sides of the two gage members 6 and 7, the lower marking or arrow 16 or 21, as the case may be registers with the lowest base marking 0 or 5, when the slider is at its lowest possible position, as may be seen in Figures 2 and 4. The upper slider marks 16 or 21 similarly register with the highest markings 14 on the base when the slider is at the highest position in the upright position of the base with its acute angle directed upward. In both cases on each side, these markings serve to indicate extreme positions and dimensions, as well as those between when the invention is applied, in concrete form.

Thus, as shown in Figures 1, 2 and 4, the massive angle member, generally indicated at 22 has one limb 23 provided with a manual set screw 24, extending into threaded hole 43 in member 22 and then into a threaded hole 44 in slide member 7, while the other limb 25 has an external slot 26 parallel with its sides and a pair of transverse holes 27, 27 extending through from side to side across slot 26. In the far side 28 of the leg or limb 25, these holes are threaded at 29, 29 to receive a pair of set screws 30, 30 to secure the shank 31 of a caliper 32 by clamping same in the slot 26. At the same time, the manual set screw 24 is screwed down into the end 33 of gage slider 7, as shown in Figure 2. The shank or scale portion 31 extends upwardly from member 22 and has the slidable inside jaw 34 with the outside jaw 35 slidable by manual adjusting means of conventional character (not shown). In this form, the invention serves to measure vertical and linear dimensions, the two arrows 16 corresponding individually to the two jaws 34 and 35, the one corresponding to the one jaw and the other to the other jaw, taken from their lowest starting positions with respect to the stationary outside jaw 36, for example.

As may be seen in Figure 3, the lower end of the scale portion 37 of another type of caliper 38 may be secured to member 22 by screws 30, 30 retaining this end in the slot 26, in contrast with the caliper 32 of Figure 2 wherein the scale is secured at the side thereof in the slot of angle member 22. Virtually the lower stationary jaw 39 of this caliper 38 is thus fixed in the slot, and the angle member as a whole then mounted on the gage slider 7 by means of manual set screw 24 as before, as shown in Figure 4. The slider is virtually reversible, but in each position, whether the slider occupies the position shown in Figure 2 or that shown in Figure 4, the adjusting and setting screw 9 which screws into a hole (not shown) in the base 6 serves to fix the slider in place. The angle member 22, of course supports the scale 32 in parallelism with set screw 24 in Figure 2, but at right angles to this screw supports scale 37 in Figure 4.

In this last view, the base and slider are disposed with their acute angled ends extending horizontally, so that the marks 21 of the slider will register variously with the scale marks 18 on the base member 6 to determine the position of the slider along base surface 10 so as to form a starting point for jaw 39 and allow adjustment of movable jaw 40 with respect thereto to bear a measurable relation to the bottom of base member 6. In this case, the slider 7 is shiftable to the upper extending extreme position indicated at 41. In the same way, the upper extreme position of the slider in Figure 2 is indicated at 42. The holding screws 30, 30 which extend through holes 27 and 29 best seen in Figure 1, serving to secure either scale 31 or 37 not only bridge the gap or slot 26 but extend transversely through the scale involved in releasable manner to allow interchange of scales and calipers mounted thereon.

Various adjustments of the slider with respect to the base 6 in both Figures 2 and 4 to utilize the gage 32 or 38 for measuring distances between the bottom of the base and the movable jaw from a starting point determined by the stationary jaw may be made at will, without resorting to the use of other measuring instruments than the calipers with the angle member 22. The markings or indicia on the two sides of the base member and the arrows on the slider serve to co-operate and bring out the utility of the angle member when mounted upon the slider.

From the foregoing, it is evident that the device may be used as a planer gage and incidental caliper as per Figure 2, capable of indicating a high dimension on a planer bed to a given work surface, while the device as shown in Figure 4 is adapted to take low upward dimensions from the bed and also gage thickness of parts and extensions on a workpiece without removing the latter from the planer bed. The device as disengaged from the slider, but ready to attach either in the position of Figure 2, or in that of Figure 4, is shown alone in Figure 3 with its set screw 24 ready for connection with the slider in both cases.

Manifestly, variations may be resorted to, and parts and features may be modified or used without others within the scope of the appended claim.

Having now fully described my invention, I claim:

A combined scale and gage attachment means, including a substantially triangular base member with a gage slider adjustably mounted upon an inclined edge of the base member, a scale with gaging jaws thereon adapted to be supported upon the gage slider, and a right angled holder member with two arms disposed at right angles to each other with one arm having an elongated slot open to the outside of the member into which one end of the scale is adapted to extend in alternative positions at right angles to each other, said one arm having transverse holes for transverse pins or screws to secure the scale in place in said slot, the other arm having an inwardly directed hole for a set screw for securing the holder to one end of the slider upon the exterior thereof, in all positions of said slider relative to said scale and base member.

References Cited in the file of this patent
UNITED STATES PATENTS

| | | |
|---|---|---|
| 2,219,180 | Fichter | Oct. 22, 1940 |
| 2,242,116 | Donaway | May 13, 1941 |
| 2,353,886 | Findley et al. | July 18, 1944 |
| 2,454,327 | Malsom | Nov. 23, 1948 |